United States Patent Office

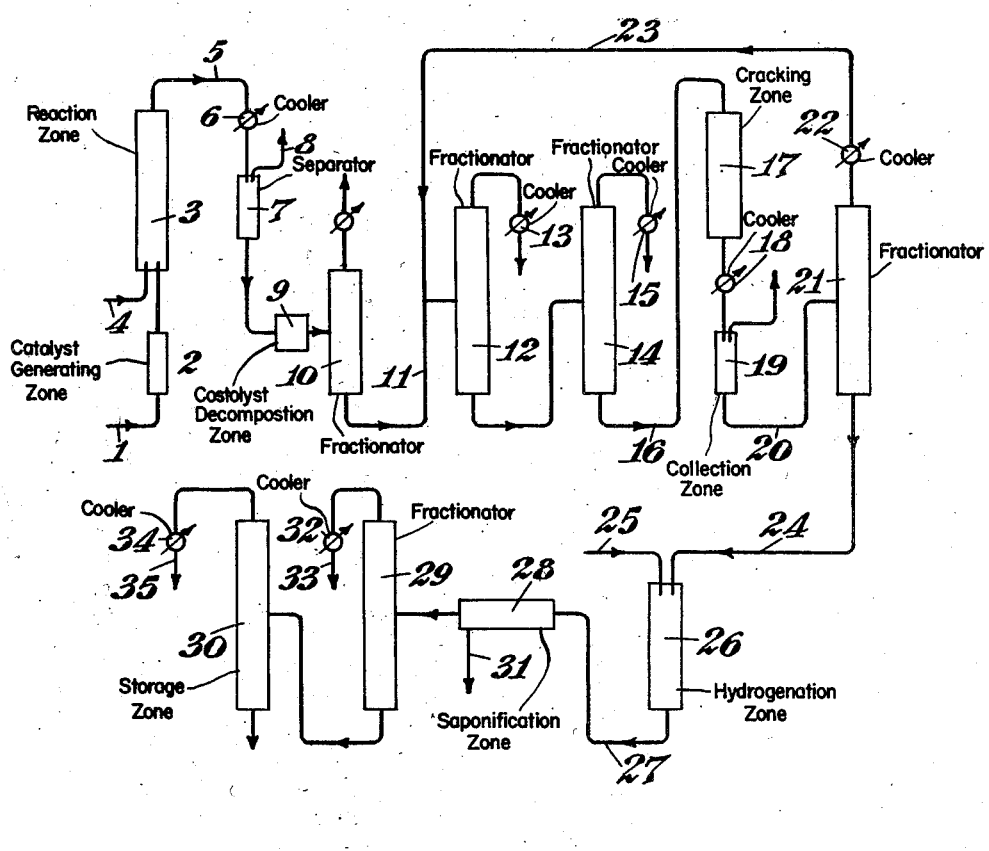

2,821,559
Patented Jan. 28, 1958

2,821,559

PRODUCTION OF ALDEHYDES

John Habeshaw and Robin William Rae, Sunbury-on-Thames, England, assignors to The British Petroleum Company Limited Application July 18, 1952, Serial No. 299,678

Claims priority, application Great Britain July 25, 1951

15 Claims.  (Cl. 260—604)

This invention relates to improved process for the production of oxygenated organic compounds. More particularly the invention relates to an improved process for the production of aldehydes by the Oxo synthesis reaction.

It is well known that by reacting olefines with carbon monoxide, in the presence of other compounds such as hydrogen, water or alcohols, oxygenated organic compounds may be synthesised, the method being known as the Oxo synthesis reaction. Thus by reacting an olefine with water gas at temperatures of about 80° C.–180° C. and at pressures of about 50–300 atmospheres, in the presence of a suitable catalyst, aldehydes having one more carbon atom/molecule than the olefine, are obtainable in good yields. From ethylene, a single aldehyde, propionaldehyde is formed as the main product. From higher olefines, mixtures of isomeric aldehydes are formed as the main product.

Catalysts commonly employed hitherto have been solid cobalt-containing materials, a typical catalyst being one containing by weight 100 parts of cobalt, 5 parts of thoria, 9 parts of magnesia and 200 parts of kieselguhr.

It is an object of this invention to provide an improved process for the production of oxygenated organic compounds. It is a further object to provide a process for the production of aldehydes, in improved yields, by the Oxo synthesis reaction. Other objects will appear hereinafter.

According to the invention oxygenated organic compounds, obtained in the Oxo synthesis reaction and boiling above the main aldehydic product of the reaction, are subjected to a mild cracking treatment, for conversion, at least in part, to said main aldehydic product.

According to a further feature of the present invention, an olefinic hydrocarbon is reacted with carbon monoxide and hydrogen in the presence of a cobalt catalyst under the conditions of the Oxo synthesis reaction, the product treated for the separation of an aldehydic fraction comprising the aldehyde constituting the main Oxo synthesis product, said aldehyde being of one more carbon atom/molecule than the olefin treated and for the separation of a high boiling fraction, boiling above said aldehydic fraction, the high boiling fraction treated under mild cracking conditions for the production of said aldehyde, and thereafter said aldehyde recovered from the product of the cracking treatment.

Preferably the Oxo synthesis products are first subjected to phase separation for removal of a gaseous effluent and the liquid phase so obtained distilled for the separation of an olefinic fraction (except when ethylene is employed), an aldehydic fraction and a high boiling fraction. After the cracking of the high boiling fraction, the cracked product or a fraction thereof comprising the aldehydes formed may be admixed with the distillation feed for the recovery of an augmented main aldehydic product.

The cracking treatment may be carried out in the presence or absence of catalysts. Suitable catalysts include pumice, activated alumina, silica-alumina gel, silica-magnesia, silica and alumina or silica alumina gels containing minor proportions of metal oxides such as urania, zirconia, titania or oxides of manganese, calcined bauxites such as Indian bauxite, treated natural clays such as kaolin or montmorillonite, and, in general, other catalysts conventionally employed in the cracking of hydrocarbons.

In general catalytic cracking is carried out at temperatures in the range 100–350° C. and pressures in the range 1–20 atmospheres, although, if desired, higher or lower temperatures and pressures may be employed.

The preferred catalysts are synthetic silica-alumina gel catalysts and in operation with these the preferred temperature is 150–300° C. Pressures in the treatment of products derived from $C_3$ or higher olefine hydrocarbons preferably lie in the range 1 to 10 atmospheres. However, in the case of products from the ethylene reaction, the pressure should be sufficient to ensure condensation of the aldehyde formed at normal cooling water temperatures. The liquid flow rate will usually be in the range 0.5–5.0 vol./vol./hour and preferably in the range of 1–3 vol./vol./hour.

The products formed in the catalytic reaction tend to have lower bromine numbers as the catalyst ages, although the activity for the formation of aldehydes declines only very slowly. The catalyst activity may be restored by the usual methods, for example by treating with an inert gas (e. g. nitrogen) at elevated temperatures in the range 250–300° C. and eventually by burning off the carbon deposit in a current of an oxygen-containing gas. The first method restores the activity responsible for forming products of high bromine number and the second reverses the very slow fall in general activity due to the deposition of small quantities of carbon on the catalyst.

Thermal cracking is generally carried out at 150° C. to 450° C. and at pressures from atmospheric to 500 lb./sq. in. or more.

In general, the process of this invention may be applied to the Oxo synthesis products obtained from any olefine hydrocarbons, products obtained from monoolefine hydrocarbons of 2–9 carbon atoms/molecule being preferred. The process has been found particularly satisfactory in augumenting the yields of normal- and iso-butyraldehydes obtained by the conversion of propylene in the Oxo synthesis reaction.

The residual material after recovery of the required aldehydes from the cracked product usually contains higher aldehydes. If desired, these may be hydrogenated and the hydrogenated product treated for the recovery of alcohols. Thus from the products of the conversion of propylene in the Oxo synthesis reaction, useful mixtures of butanols and $C_8$ alcohols may be recovered in this manner.

Although the Oxo synthesis reaction may be carried out in the presence of any of the cobalt catalysts known in the art for this purpose, the preferred process is operated in the presence of a cobalt carbonyl or cobalt hydrocarbonyl catalyst, prepared outside the reaction zone, the zone being operated without the introduction, before or during the reaction, of cobalt metal or solid cobalt compounds. This preferred process and other preferred process conditions, including methods of product and catalyst recovery, are described in the specifications filed in respect of co-pending United States applications Ser. No. 78,226, filed February 24, 1949, by John Habeshaw and Charles John Geach (now abandoned); Ser. No. 184,684, filed September 13, 1950, by John Habeshaw and Charles John Geach (now abandoned); Ser. No. 151,828, filed March 24, 1950, by John Habeshaw and Charles John Geach (now abandoned); Ser. No. 139,936, filed January 21, 1950, by John Habeshaw and Leslie Senior Thornes (now abandoned); Ser. No. 206,324, filed January 17, 1951, by Andrew McLean and John Habeshaw (now abandoned);

Ser. No. 205,298, filed January 10, 1951, by John Habeshaw and Leslie Senior Thornes (now pending).

The operation of the process is illustrated but not limited with reference to the figure accompanying the complete specification, which is a diagrammatic flow sheet of a process suitable for application to the synthesis of butyraldehydes from propylene.

A mixture of carbon monoxide and hydrogen, compressed and preheated, is passed by the line 1 to the catalyst generating zone 2. In this a portion of the gas, depending in amount on the cobalt input required to the reaction zone 3, is passed over reduced cobalt oxide contained in the zone 2, which may consist of two or more vessels alternately on stream, or charging with or reducing the cobalt oxide. The gas stream containing catalysts joins the olefine feed stream passing through line 4 and enters the reactor 3, when conversion to aldehyde occurs. The reaction products leave 3 by the line 5 and cooler 6 and pass to the phase separator 7, from which gaseous product is removed by the line 8. Pressure is reduced on the liquid product leaving 7 in one or more stages (not shown in the figure), gas released on pressure reduction being separated and the liquid product at a final pressure in the range 100–500 lbs./sq. in. is passed to the zone 9, where cobalt carbonyl is decomposed at a temperature of about 150–200° C., solid cobalt being formed and separated. The substantially cobalt free liquid product is then passed to the fractionator 10, preferably operated at around 100 lbs./sq. in. where unreacted propylene and propane are taken overhead. The $C_3$ free product is then passed to the fractionator 12, operated at atmospheric pressure, where isobutyraldehyde is separated as distillate and passed to storage after cooling in 13. The residue from this operation passes to the fractionator 14 where the normal butyraldehyde product is separated as a distillate. The bottoms from 14, is fed through line 16 to the racking zone 17. The zone 17 is preferably packed with a suitable cracking catalyst and operated at a temperature of about 150–300° C. The products from 17 are cooled in 18 and collected in 19 where the very small amount of gas which may be formed is removed, passing thence by the line 20 to the fractionator 21, operated at atmospheric pressure. In this the butyraldehyde products are taken overhead, cooled in 22 and passed by the line 23 to the primary butyraldehyde fractionator 12. In the butyraldehyde synthesis a negligible amount of lower olefines is produced in the cracking zone, but in other cases (e. g. in producing isovaleraldehyde from isobutene) some olefines may be formed, and in such cases the distillate aldehyde from 21 may advantageously be passed to fractionator 10, where such olefines may be removed overhead with the unreacted olefine from the Oxo reaction zone. (If desired the product from 17 may be fractionated separately.) The residue from fractionator 21 may be further treated to recover further products. This residue is fed by line 24 to the hydrogenation zone 26, together with hydrogen admitted by line 25. The hydrogenated product is passed by line 27 to the zone 28, where the esters present are saponified with alkali. The aqueous solution of alkali salts of the acids is removed by line 31. The treated oil layer is passed, after separation of the aqueous layer and drying to the fractionator 29. Here butanols are taken overhead, cooled in 32 and passed to storage by the line 33. These butanols are a mixture of isobutanol and normal butanol, the normal butanol usually predominating and if desired may be separated into the individual alcohols by fractionation. The residue from 29 is passed to the fractionator 30, advantageously operated under reduced pressure, in which a $C_8$ alcohol product is taken overhead, cooled in 34 and passed to storage by the line 35.

It is preferred to operate the process continuously, but obviously the saponification zone 28 and the fractionator 29 and 30 may be operated batchwise and this would be preferred when the scale of operations is relatively small.

If desired, the operations for treating the residue from 21 subsequent to the fractionator 21 may be omitted. Also, if desired, a single aldehyde product may be prepared and recovered as distillate in the fractionator 12, and in such cases the fractionator 14 would not be required. In such cases also the overhead from 21 may be added to that from 12 and not recycled to 12 for redistillation.

The invention is further illustrated but in no way limited by the following examples.

Examples 1–7 relate to the processing of a high boiling product obtained in the conversion of propylene to butyraldehydes by the Oxo synthesis reaction, the reaction pressure being 3000 p. s. i. g. and the temperature 300° F. The product, after separating gaseous material at 200 lbs./sq. in. pressure, decomposing cobalt compounds therein, filtering off metallic cobalt, was fractionated to separate a $C_3$ hydrocarbon fraction and an isobutyraldehyde and normal butyraldehyde fraction, leaving a residue of higher boiling by-products. These higher boiling by-products formed the feedstock to the experiments described.

The catalyst employed in the Oxo synthesis reaction was prepared outside the Oxo reactor and was the sole catalyst introduced thereto. The catalyst was dicobalt octacarbonyl (Examples 1–4) and cobalt carbonyl hydride (Examples 5–7) and was employed in an amount constituting 0.03% estimated as cobalt, based on olefine feed.

EXAMPLE 1

The liquid feed constituting 17% by weight of the total $C_3$ free Oxo synthesis product was passed through a preheating section and thence through a reactor packed with granulated pumice. The tests were all carried out at atmospheric pressure. Aldehyde contents of the products, the temperature of operation and the flow rates used are all shown in the following Table 1.

*Table 1*

FEED ANALYSIS

Aldehyde content, as wt. percent CHO _____ 4.2
Bromine Number _____ 14

| Run No. | Temp., ° C. | Feed rate, vols. liquid per volume catalyst per hour | Product Analyses | |
|---|---|---|---|---|
| | | | Wt. percent—CHO | Bromine No. |
| 1 | 139 | 0.69 | 8.4 | 19 |
| 2 | 172 | 0.67 | 11.0 | 20 |
| 3 | 221 | 0.59 | 11.7 | 22 |
| 4 | 270 | 0.68 | 11.0 | 22 |

EXAMPLE 2

The method used was the same as in Example 1, except that the cracking reactor was packed with activated alumina. Conditions and results are summarised in Table 2. The feed was the same as in Example 1.

*Table 2*

| Run No. | Temp., ° C. | Liquid feed rate, v./v./hr. | Product Analyses | |
|---|---|---|---|---|
| | | | Wt. Percent—CHO | Bromine No. |
| 5 | 145 | 0.69 | 10.6 | 24 |
| 6 | 180 | 0.69 | 11.1 | 21 |
| 7 | 231 | 0.69 | 11.9 | 22 |
| 8 | 275 | 0.72 | 13.1 | 27 |

EXAMPLE 3

The method and feedstock used here was the same as in Examples 1 and 2 but the cracking catalyst was a synthetic silica-alumina gel catalyst such as is used in the catalytic cracking of hydrocarbons. The conditions and results obtained are shown in Table 3.

Table 3

| Run No. | Temp., °C. | Liquid Feed Rate, v./v./hr. | Product Analyses | |
|---|---|---|---|---|
| | | | Wt. Percent—CHO | Bromine No. |
| 9 | 143 | 0.67 | 10.4 | 25 |
| 10 | 172 | 0.68 | 13.3 | 35 |
| 11 | 238 | 0.71 | 13.7 | 41 |
| 12 | 280 | 0.67 | 13.2 | 48 |

EXAMPLE 4

Products from various of the runs of Examples 1, 2 and 3 were distilled to separate a butyraldehyde fraction. The recovery of butyraldehyde obtained in this way (as 100 percent butyraldehyde) is shown in Table 4.

Table 4

| Cracking Test No. | 3 | 8 | 12 |
|---|---|---|---|
| Cracking catalyst | pumice | activated alumina | silica-alumina |
| Recovered Butyraldehyde as wt. percent of total cracked products | 14 | 22 | 20 |

EXAMPLE 5

This example illustrates the production of aldehydes by thermal treatment of a high boiling by-product. The liquid feedstock amounting to 17 percent by wt. of the total $C_3$-free product, was placed in a batch still and heated in the still pot to a temperature of 150° C., distillate containing butyraldehydes being removed overhead. 21.6 percent by weight of the charge boiling below 96° C. was distilled off during a period of three hours. This distillate contained 61 percent by weight of butyraldehydes, the ratio of iso- to normal aldehyde being 1:3. Analysis of the residue before this treatment showed that it contained 5% by weight of normal aldehyde and no isobutyraldehyde.

EXAMPLE 6

A liquid feedstock prepared in the same way as in Example 5, but in this case amounting to 22% by weight of the total $C_3$-free Oxo synthesis product, was processed over a synthetic silica-alumina gel catalyst with conditions and results shown in Table 5.

Table 5

FEED ANALYSIS

Aldehyde content, as wt. percent CHO _____ 6.3
Bromine No _____ 11

| Run No. | Temp., °C. | Liquid feed rate, vol./vol. catalyst hour | Product Analysis | |
|---|---|---|---|---|
| | | | Aldehyde as wt. percent—CHO | Bromine No. |
| 13 | 230 | 1.04 | 16.7 | 32 |
| 14 | 278 | 0.96 | 16.9 | 42 |
| 15 | 276 | 1.98 | 17.4 | 42 |
| 16 | 240 | 2.14 | 17.0 | 30 |
| 17 | 234 | 2.48 | 16.9 | 30 |

EXAMPLE 7

This illustrates a preferred method of operation in processing the high boiling by-products from the conversion of propylene to butyraldehydes. The high boiling products used as feedstock were the same as those used in Example 6. During a 24 hour test-period, this material was processed at atmospheric pressure and at a temperature of 229–238° C. over a synthetic silica-alumina gel catalyst, the liquid feed rate being 2.0 volumes liquid/volume catalyst/hour. The product obtained from the test had an aldehyde content (by titration) of 16.9 percent by weight (calcd. as —CHO) and a bromine number of 30. A very small quantity of water was separated and the remaining product fed to a continuous 40 plate fractionator, the feed being admitted at the 20th plate. A distillate amounting to 40 percent by weight of the total was removed on this column. This butyraldehyde concentrate was then analysed and found to have an isobutyraldehyde:normal butyraldehyde ratio of 1:3.5 by weight. The aldehyde concentrate was reprocessed through the same continuous column, an iso-butyraldehyde distillate containing 81.4 percent of isobutyraldehyde and amounting to 9 percent by weight of the total high boilers processed being obtained. Redistillation of the isobutyraldehyde-free residue from this operation to leave a residue of 20% by weight gave a normal butyraldehyde distillate amounting to 27 percent by weight of the original high boilers present and containing 90.2 percent by weight of normal butyraldehyde. In this example the isobutyraldehyde and normal butyraldehyde formed during the cracking step were isolated by fractionation separately from the main butyraldehyde products formed in the Oxo reactor.

EXAMPLE 8

This example illustrates the application of the process to a high boiling residue formed in the preparation of isovaleraldehyde from isobutene by the Oxo synthesis reaction. Analytical data on the feedstock were as follows:

Aldehyde content, as wt. percent —CHO _____ 9.3
Acid No. milligrams KOH/gram _____ 25
Bromine No _____ 2
Saponification No _____ 77

This feed was pumped over a bed of the silica-alumina catalyst as used in Example 6, conditions and product analyses being shown in Table 6. The pressure was atmospheric.

Table 6

| Run No. | 18 | 19 |
|---|---|---|
| Temperature (catalyst) | 260 | 238 |
| Liquid feed rate, vol./vol./hr | 1.04 | 1.00 |
| Analytical Data on Products: | | |
| Aldehyde Content, wt. percent as—CHO | 12.3 | 12.0 |
| Acid No | 21 | 15 |
| Bromine No | 83 | 41 |
| Saponification No | 27 | 54 |

As well as isovaleraldehyde, the cracked products in this case were found to contain pentenes (mainly 2-methyl-butene-2). In run 18 the aldehyde recovered by distillation amounted to 34 percent by weight of the cracked product and in run 19 to 24 percent by weight.

EXAMPLE 9

This example illustrates the production of useful materials from the residue left after the removal of aldehydes from the cracked products. The residue left after distilling off the butyraldehyde concentrate in Example 7 was hydrogenated continuously over a nickel-kieselguhr catalyst at a temperature of 133°–146° C. and a pressure of 1300 lbs./sq. in. to yield a product substantially free of aldehydes and olefinic unsaturation. This hydrogenated product was distilled to yield a fraction boiling up to 62° C. at 10 mm. pressure and a fraction distilling between 38.5° C. at 0.7 mm. and 84° C. at 0.4 mm., these two fractions comprising respectively 52 percent and 32 percent by weight of the total hydrogenated products. Each of these fractions was separately saponified by heating at 100° C. with aqueous caustic soda for 10 hours, and the oil, after saponification, distilled. From the lower boiling fraction a distillate consisting mainly of a mixture of isobutanol and normal butanol was obtained and from the higher boiling fraction some butanols and a $C_8$ alcohol fraction (main constituent 2-ethyl hexanol) were obtained. Acidification of the aqueous layers from the saponification liberated the organic acids present in the esters contained in the original. These organic acids were mainly formic acid and the two butyric acids, but some higher acids were also present. The yields of these various products obtained in these operations are shown in Table 7, all being expressed as weights percent of the original high boilers fed to the cracking operation of Example 7.

*Table 7*

| | |
|---|---|
| Mixed butanols | 16 |
| $C_8$ alcohols | 7 |
| Formic + butyric acids | 12 |
| High boiling residue | 9 |
| Unidentified products and losses | 20 |

We claim:

1. Process for the production of aldehydes which comprises thermally cracking a distillation fraction which has been obtained from a product of the conversion of olefinic hydrocarbons to oxygen-containing organic compounds by the Oxo synthesis reaction, said fraction boiling above the boiling range of the main aldehydic product of said Oxo synthesis reaction, whereby said fraction is converted at least in part to yield said main aldehydic product.

2. Process for the production of aldehydes which comprises catalytically cracking a distillation fraction which has been obtained from a product of the conversion of olefinic hydrocarbons to oxygen-containing organic compounds by the Oxo synthesis reaction, said fraction boiling above the boiling range of the main aldehydic product of said Oxo synthesis reaction, whereby said fraction is converted at least in part to yield said main aldehydic product.

3. Process for the production of aldehydes by the Oxo synthesis reaction and wherein said aldehydes are produced in augmented yields which comprises reacting an olefinic hydrocarbon with carbon monoxide and hydrogen in the presence of a cobalt catalyst under the conditions of the Oxo synthesis reaction, distilling the product for the separation of an aldehydic fraction comprising the aldehyde constituting the main Oxo synthesis product, and of a high boiling fraction, boiling above said aldehydic fraction, subjecting said high boiling fraction to cracking conditions for the production of said aldehyde and recovering the said aldehyde from the product of the cracking treatment.

4. Process as specified in claim 3 in which the olefin hydrocarbon has at least 3 carbon atoms/molecule and wherein the product of the Oxo synthesis reaction is subjected to phase separation for removal of a gaseous effluent and the liquid phase so obtained distilled for the separation of an olefinic fraction, the aldehydic fraction and a high boiling fraction.

5. Process as specified in claim 4 in which product of the cracking treatment is distilled, whereby high boiling materials are retained in the residue, and a distillate fraction recycled and distilled together with the Oxo synthesis product.

6. Process as specified in claim 3 in which the cracking treatment is thermal cracking.

7. Process as specified in claim 6 in which the cracking treatment is carried out at a temperature in the range 150–450° C.

8. Process as specified in claim 6 in which the cracking treatment is carried out at a pressure in the range 1–10 atmospheres.

9. Process as specified in claim 3 in which the cracking treatment is catalytic cracking.

10. Process as specified in claim 9 in which the cracking treatment is carried out at a temperature in the range 100–350° C.

11. Process as specified in claim 9 in which the cracking treatment is carried out at a pressure in the range 1–20 atmospheres.

12. Process as specified in claim 6 in which the cracking catalyst is a synthetic silica-alumina gel.

13. Process as specified in claim 12 in which the cracking is carried out at a temperature in the range 150–300° C.

14. Process as specified in claim 3 in which the olefinic hydrocarbon is propylene.

15. Process for the production of aldehydes by the Oxo synthesis reaction and wherein said aldehydes are produced in augmented yields which comprises reacting an olefinic hydrocarbon with carbon monoxide and hydrogen in the presence of a cobalt catalyst under the conditions of the Oxo synthesis reaction, distilling the product for the separation of an aldehydic fraction, comprising the aldehyde constituting the main Oxo synthesis product, and of a high boiling fraction, boiling above said aldehydic fraction, subjecting said high boiling fraction to cracking conditions for the production of said aldehyde, distilling the product of the cracking treatment, separating an aldehydic fraction and a high boiling cracked fraction, hydrogenating said high boiling cracked fraction, and thereafter separating alcohols from the hydrogenated product.

References Cited in the file of this patent

UNITED STATES PATENTS

| | | |
|---|---|---|
| 2,264,427 | Asbury | Dec. 2, 1941 |
| 2,514,961 | Max | July 11, 1950 |
| 2,564,104 | Gresham | Aug. 14, 1951 |
| 2,594,341 | Owen | Apr. 29, 1952 |
| 2,595,096 | Parker | Apr. 29, 1952 |
| 2,609,337 | Taylor | Sept. 2, 1952 |
| 2,614,070 | Smith | Oct. 16, 1952 |
| 2,623,074 | Ratcliff | Dec. 23, 1952 |

OTHER REFERENCES

Hurd: "Pyrolysis of Organic Compound" (1929), p. 165, Chemical Catalog Co., publisher, New York.

Chem. Abstracts, vol. 24, (1930), page 1616[5].

Chem. Abstracts, vol. 42, (1948), page 7244g.

Chem. Abstracts, vol. 43, (1949), page 1715d.

Chem. Abstracts, vol. 43 (1949), page 7496h.